(12) United States Patent
Senn (10) Patent No.: US 10,040,638 B2
(45) Date of Patent: Aug. 7, 2018

(54) DEVICE AND METHOD FOR PERFORMING SPECIAL FUNCTIONS OF A TRANSPORT APPARATUS IN A CONTAINER PROCESSING INSTALLATION

(71) Applicant: KRONES AG, Neutraubling (DE)

(72) Inventor: Konrad Senn, Regensburg (DE)

(73) Assignee: KRONES AG, Neutraubling (DE)

( * ) Notice: Subject to any disclaimer, the term of this patent is extended or adjusted under 35 U.S.C. 154(b) by 151 days.

(21) Appl. No.: 14/917,153

(22) PCT Filed: Aug. 13, 2014

(86) PCT No.: PCT/EP2014/067294
§ 371 (c)(1),
(2) Date: Mar. 7, 2016

(87) PCT Pub. No.: WO2015/036193
PCT Pub. Date: Mar. 19, 2015

(65) Prior Publication Data
US 2016/0194158 A1 Jul. 7, 2016

(30) Foreign Application Priority Data

Sep. 13, 2013 (DE) .................. 10 2013 218 402

(51) Int. Cl.
*G01B 7/14* (2006.01)
*G01B 7/30* (2006.01)
(Continued)

(52) U.S. Cl.
CPC ............ *B65G 43/00* (2013.01); *B08B 1/04* (2013.01); *B65G 45/02* (2013.01); *B65G 45/10* (2013.01);
(Continued)

(58) Field of Classification Search
CPC ........ G01R 21/133; G01R 27/14; G06F 13/20
(Continued)

(56) References Cited

U.S. PATENT DOCUMENTS

| 5,547,285 A | 8/1996 | Hutzel et al. |
| 6,617,972 B2 * | 9/2003 | Takarada ........... G08B 21/0484 324/538 |

(Continued)

FOREIGN PATENT DOCUMENTS

| DE | 10040531 A1 | 2/2002 |
| DE | 102004048515 A1 | 4/2006 |

(Continued)

OTHER PUBLICATIONS

European Patent Office Examination Report, dated Aug. 28, 2017.
(Continued)

*Primary Examiner* — Giovanni Astacio-Oquendo
(74) *Attorney, Agent, or Firm* — Marshall, Gerstein & Borun LLP (57) ABSTRACT

A transport apparatus for transporting containers in a container-processing installation. The transport apparatus includes a transport track, a plurality of transport elements for transporting one or more containers, wherein the plurality of transport elements is movably arranged on the transport track, at least one special element, which is movably arranged on the transport track and is different from the plurality of transport elements, and an open-loop and/or closed-loop control unit. The transport track, the plurality of transport elements, and the special element are designed in such a way that the plurality of transport elements and the special element can be guided along the transport track in such a way that the plurality of transport elements and the special element are individually controllable by the open-loop and/or closed-loop control unit.

19 Claims, 3 Drawing Sheets

(51) Int. Cl.
| | |
|---|---|
| *G01R 33/06* | (2006.01) |
| *H01L 43/06* | (2006.01) |
| *B65G 43/00* | (2006.01) |
| *B65G 45/02* | (2006.01) |
| *B65G 45/18* | (2006.01) |
| *B65G 54/02* | (2006.01) |
| *B08B 1/04* | (2006.01) |
| *B65G 45/10* | (2006.01) |

(52) U.S. Cl.
CPC ............ *B65G 45/18* (2013.01); *B65G 54/02* (2013.01); *B65G 2811/0673* (2013.01)

(58) Field of Classification Search
USPC ............ 324/76.11, 76.61, 76.69, 76.74, 103
See application file for complete search history.

(56) References Cited

U.S. PATENT DOCUMENTS

| | | | | |
|---|---|---|---|---|
| 8,779,729 | B2* | 7/2014 | Shiraishi | G01R 31/3606 |
| | | | | 320/134 |
| 2012/0098518 | A1* | 4/2012 | Unagami | G01R 22/066 |
| | | | | 324/74 |
| 2014/0125369 | A1* | 5/2014 | Erickson | G01R 31/307 |
| | | | | 324/754.22 |
| 2014/0203827 | A1* | 7/2014 | Thangaraju | H01L 21/76898 |
| | | | | 324/713 |
| 2015/0187680 | A1* | 7/2015 | Seo | H01L 23/481 |
| | | | | 324/762.01 |

FOREIGN PATENT DOCUMENTS

| | | |
|---|---|---|
| DE | 102012010677 A1 | 12/2013 |
| EP | 0589844 A1 | 3/1994 |
| EP | 1182153 A1 | 2/2002 |
| EP | 1182153 B1 | 11/2003 |
| EP | 1645340 B1 | 10/2010 |
| EP | 3003926 A1 | 4/2016 |
| JP | S5925572 A | 2/1984 |
| JP | S6192950 A | 5/1986 |
| JP | H05213446 A | 8/1993 |
| WO | WO-2006/021778 A1 | 3/2006 |
| WO | WO-2014191229 A1 | 12/2014 |

OTHER PUBLICATIONS

International Search Reporting for International Application No. PCT/EP2014/067294, dated Jan. 13, 2015.

German Search Report for Application No. 102013218402.6, dated Aug. 26, 2014.

Notification of the Third Office Action for Chinese Application No. 201480049940.8, dated Oct. 25, 2017.

* cited by examiner

DEVICE AND METHOD FOR PERFORMING SPECIAL FUNCTIONS OF A TRANSPORT APPARATUS IN A CONTAINER PROCESSING INSTALLATION

CROSS-REFERENCE TO RELATED APPLICATION

The present application is the US national phase of International Patent Application No. PCT/EP2014/067294, filed Aug. 13, 2014, which application claims priority to German Application No. DE 102013218402.6, filed Sep. 13, 2013. The priority application, DE 102013218402.6, is hereby incorporated by reference.

FIELD OF THE INVENTION

The present invention relates to a device and a method for performing special functions of a transport apparatus with individually controllable transport elements for transporting containers, in particular bottles or cans, in an installation for processing the containers.

PRIOR ART

Containers, such as bottles, cans, etc. are in container processing installations processed in one or several successive process steps. The process steps or work steps are there generally performed in separate processing units which can be assembled, for example, as modules of a common installation concept. To reduce costs for procurement and operation of the installation, interfaces for controlling the installation, for media supply or the like, are there commonly standardized to facilitate the combination of processing units of different types and/or production capacities. A container processing installation for plastic bottles, for example, made of polyethylene terephthalate (PET), polypropylene (PEP), etc., can comprise, for example, a heating device for heating the preforms, a stretch-blow-molding device for expanding and stretching the preforms into plastic bottles, a cleaning device, a labeling device, a filling device, a sorting device, a packaging device, a sterilization device, an inspection device, a tempering device, a cooling device, a coating device, a buffering device, etc. as separate processing units that are configured in a modular manner. The individual processing units performing subsequent process steps are there in prior art generally connected in series, where one or more transport apparatuses are responsible for transporting containers from the processing units to the respective downstream processing units.

Performance of successive process steps by the separate processing units of the installation and transportation among the processing units therefore corresponds to the known principle of conveyor belt processing, in which a continuous flow of containers to be processed through the processing units arranged in series is achieved by way of appropriate control processes with respect to the processing time of the individual process steps and/or the number of containers per unit of time transported from one processing unit to the next processing unit. In installations known in prior art, transportation of the container between the processing units is often realized by way of a plurality of separate transport elements in the form of carriers which receive the containers or preforms by way of suitable holding devices, for example, specially shaped gripping elements, at a reception point, transport them through a series of consecutive processing units, and ultimately deliver them at a delivery point. The containers are there generally delivered by suitably configured feeder conveyors to the plurality of transport elements at the reception points and by suitably configured delivery conveyors received accordingly by the plurality of transport elements at the delivery points.

In order to operate a transport apparatus of such a container processing installation with individually controllable transport elements, a plurality of transport elements are necessary to move the plurality of containers to be processed that are in engagement with the container processing installation. To keep the costs of the transport elements and thus of the entire container processing installation as low as possible, it is important to use a highly advantageous guiding and bearing system for the transport elements. Since the transport apparatus and thus the guide and bearing system can depending on the container processing installation be of considerable overall length, it is possible that dirt and/or defects in the guide and bearing system arise due to the operation of the transport apparatus which—if not detected and rectified in time—can lead to stoppage of the entire container processing installation and to the production loss associated therewith. Manual inspection and maintenance of the guiding and bearing system by the operating personnel, however, involves a large effort and is time-consuming and costly.

Container processing installations for the production of different products, for example, various liquid foods, various containers, containers with different labels or the like, are generally used in separate production phases of the same container processing installation. It is for this purpose necessary to exchange required format parts and/or tooling parts of one or more processing units, for example, a stretch-blow-molding device, without major loss of time. Individual processing units, such as a cleaning device, a labeling device or a packaging device of the container processing installation, must be continuously supplied with media during operation, and other processing units, such as a filling device, must be cleaned periodically. The required format parts or tooling parts, media and/or cleaning auxiliary elements, such as cleaning-in-place (OP) caps, must generally by the operating personnel be manually introduced into the respective processing units or positioned on them, respectively. Even with semi-automated assembly of the respective parts at the respective processing unit, a loss of production time is therefore generally inevitable due to the manual delivery and removal transport of the parts. Moreover, risks to the health of the operating personnel arise with any intervention in the installation by the operating personnel.

The present invention is therefore based on the object to provide an apparatus and a method for transporting containers in a container processing installation which automatically performs special functions, such as inspecting, cleaning, converting and/or repairing the container processing installation and thereby overcomes the above-mentioned drawbacks. Stoppage of the container processing installation due to a faulty guide and bearing system is in particular to be prevented. The present invention is very generally based in the object to reduce costs for installation and operation of a transport apparatus for transporting containers in a container processing installation with a plurality of individually controllable transport elements.

DESCRIPTION OF THE INVENTION

The above objects are satisfied by a transport apparatus for transporting containers in a container processing installation comprising a transport track, a plurality of transport elements for transporting one or more containers, where the plurality of transport elements is movably arranged on the transport track, at least one special element which is movably arranged on the transport track and is different from the plurality of transport elements, and an open-loop and/or closed-loop control unit, where the transport track, the plurality of transport elements, and the special element are designed in such a way that the plurality of transport elements and the special element can be guided along the transport track in such a way that the plurality of transport elements and the special element are individually controllable by means of the open-loop and/or closed-loop control unit.

Transport apparatuses are presently and hereinafter understood to be conveyor devices which comprise transport elements for the containers that are conveyed in a closed circuit. However, this does not exclude that at least sections of the path of the transport apparatus do not form a closed circuit.

According to the invention, the transport apparatus comprises a plurality of transport elements for transporting one or more containers, where the plurality of transport elements is movably arranged on a transport track of the transport apparatus. The plurality of transport elements can comprise a plurality of identically designed transport elements which can be moved individually and independently of each other along the transport track. However, this does not exclude that individual transport elements differ from each other with respect to one or more features. The plurality of transport elements can in particular comprise at least two groups of respectively identically designed transport elements which differ among each other by at least one feature, e.g. a functional element such as a gripping element and/or a configuration of the response element described farther below. The number of transport elements on the transport track is in principle arbitrary and limited only by the length of the transport track, as long as at least two transport elements are present.

For receiving the at least one container at a reception point and delivering the container to a delivery point, the transport elements can be equipped with a suitable holding device, e.g. in the form of a gripping element. The gripping element can there be designed as being passively or actively controllable. Gripping elements are conceivable for gripping a neck portion of the containers in a positive-fit or force-fit manner, for example, by way of so-called neck handling of plastic bottles, where the container being gripped in a positive-fit manner is mounted rotatable about its longitudinal axis in the gripping element. In addition, the gripping element can be pivotable and/or adjustable in height.

Containers within the meaning of the invention are in particular beverage bottles and also other containers for food, medicines, toiletries, detergents or the like, such as cans, glass bottles and other glass containers with lids, packaging based on cardboard or composites, Tetra Packs, or the like. Intermediate products are also conceivable as containers made of plastic, in particular preforms for stretch-blow-molding the containers. Furthermore, containers within the meaning of the invention are also understood to be packs with several containers.

According to the invention, the transport apparatus comprises at least one special element which is like the transport elements movably arranged on the transport track, but is different from the plurality of transport elements. The at least one special element of the plurality of transport elements can in particular be different in that it does not have a holding device for the containers and therefore does not serve to transport the container in the container processing installation. The at least one special element instead generally comprises one or more devices which are adapted to perform one or more special functions, hence not transporting the containers, of the transport apparatus, and which the plurality of transport elements lack. Apart from these additional devices described farther below, the at least one special element can in particular in view of its drive be configured as corresponding to the plurality of transport elements.

The transport elements and the special element can be designed as a runner, a puck, a carriage, a shuttle or the like, which are moved by interaction with the transport track. Each transport element or special element can there—as needed—also be accelerated, decelerated, moved at a uniform speed, or at times be stopped completely on the transport track. The special element can for performing one of the special functions described farther below in particular be temporarily stopped at a predetermined location of the transport track. By controlling the transport elements and the special element individually, a variable distance-time profile for each transport element or special element, respectively, can thereby be realized. Furthermore, each transport element and/or the special element can comprise a unique identification unit, e.g. in the form of a bar code, a readable memory chip, an alphanumeric code printed on, glued on and/or engraved, etc., where it is enabled by one or more suitable identification detection devices along the transport track that the transport element or the special element, respectively, passing the respective identification detection device is identified. The identification unit of the transport element or of the special element, respectively, can in particular be used for selectively guiding the transport element or the special element, for example, to a certain delivery point or to a predetermined position of the transport track.

The shape of the transport track is basically arbitrary. The transport track can in particular be substantially closed, whereby substantially closed means that the transport track enables at least one closed path for the transport elements or the special element, respectively. In one embodiment, this can be realized by providing a return path as portion of the transport track, where the return path allows returning the transport elements from a delivery point to a reception point. The transport track, however, can also at least in part be designed as being open in such a way that at least a section of the path of the transport track is designed as a dead end for the transport elements, where return of the transport elements can be enabled by reversing the direction of movement. Such a dead end can in particular terminate at a delivery point.

According to the invention, the transport track, the plurality of transport elements, and the special element are designed in such a way that the plurality of transport elements and the special element can be guided along the transport track in such a way that the plurality of transport elements and the special element are individually controllable by means of the open-loop and/or closed-loop control unit of the transport apparatus. When moving the transport element or the special element along the transport track, the transport track can comprise a guide rail and/or a guide channel for guiding the transport elements or the special element, respectively. Accordingly, the transport elements and the special element can comprise a complementary guide channel, a complementary guide element, e.g. a guide pin and/or one or more suitably arranged guide rollers which run, e.g. by use of a wheel flange, on the guide rail of the transport track. A plurality of alternative embodiments is there conceivable, e.g. by way of the sliding bearing described farther below. Providing at least one guide rail on the transport track enables low-friction sliding of the transport elements or the special element, respectively, along the transport track. Moreover, the transport track can comprise a running surface along which respective support elements, e.g. support rollers, can roll or slide.

According to the invention, the plurality of transport elements and the at least one special element are guided along the transport track by way of the open-loop and/or closed-loop control unit, e.g. in the form of a process computer. The open-loop and/or closed-loop control unit can there be part of an open-loop and/or closed-loop control unit of the container processing installation or be configured as a separate open-loop and/or closed-loop control unit of the transport apparatus. Furthermore, the open-loop and/or closed-loop control unit can be realized by a central open-loop and/or closed-loop control unit and/or by open-loop and/or closed-loop control units locally arranged on the transport elements or on the special element, respectively. Furthermore, the one or more open-loop and/or closed-loop control units can be designed as (a) programmable logic control unit(s) PLC.

According to one development, the plurality of transport elements, the special element and at least a section of the transport track can be formed such that the plurality of transport elements and the special element can in the area of the section of the transport track be moved by way of a magnetic force, preferably in interaction with the transport track. According to the invention, the transport track, the transport elements and the special element are configured such that each transport element and the special element can be guided in a manner individually controllable along the transport track, e.g. from a reception point to a delivery point or a predetermined location of the transport track. This means that the transport elements and the special element each comprise at least one response element which by way of mechanical and/or electromagnetic interaction with interaction elements disposed along the transport track experience a force with which the transport elements or the special element, respectively, can be accelerated and moved. By selectively actuating the response element of a particular transport element or special element, respectively, and/or one or more interaction elements in a limited area of the transport track, this application of force can be limited to a particular transport element or special element, respectively, whereby the transport element or the special element, respectively, can be guided individually and independently of other transport elements or special elements, respectively, along the transport track. In the development described, the transport elements and the at least one special element can be moved by way of a magnetic force preferably in interaction with the transport track. Individual control of the transport elements and the special element, respectively, or actuating the response elements and/or the interaction elements occurs by way of the open-loop and/or closed-loop control unit of the transport apparatus.

The respective section of the transport track can therefore be equipped with a magnetic linear drive, e.g. in the form of an asynchronous linear motor. For this purpose, the respective section of the transport track is equipped with a plurality of electrical windings in the form of individually actuatable electromagnets. In order to create magnetic interaction between a transport element or a special element, respectively, and the individually actuatable electromagnets of the transport track, the transport element or the special element, respectively, can be fitted with one or more permanent magnets or non-switching electromagnets or iron cores. In one possible embodiment, the transport element or the special element, respectively, is embodied as a passive transport element or special element, respectively, which is moved by interaction with the electromagnetic alternating fields generated by the individually actuatable electromagnets of the transport track. The at least one permanent magnet or non-switching electromagnet or iron core, respectively, of the transport element or the special element, respectively, therefore forms the above-mentioned response element, while the individually actuatable electromagnets of the transport track form the above-mentioned interaction elements. A locating unit is preferably arranged on the transport track when using passive transport elements or special elements, respectively, to determine the position of at least one transport element or special element, respectively, and preferably of all the transport elements or special elements and to pass it to the open-loop and/or closed-loop control unit for controlling the electromagnets of the transport track. The strength of current through the electrical windings of the transport track can be adjusted automatically by the open-loop and/or closed-loop control unit depending on the power demand from the transport element or special element, respectively, to be moved. By individually controlling the strength of current through the individual windings of the transport track, the transport element or special element, respectively, can be accelerated, decelerated or moved at a uniform predetermined speed.

In an alternative embodiment, the transport element or special element, respectively, is as an active transport element or special element, respectively, provided with electrical windings which can apply the magnetic alternating fields necessary for the drive. Accordingly, the section of the transport track is provided with permanent magnets or non-switching electromagnets. Both the electrical energy necessary for the drive as well as the signals necessary for the controller can there be transmitted by induction transmission to the transport element or to the special element, respectively. The controller can therefore be located decentralized on the individual transport elements or special element, respectively, or also be centrally accommodated in a separate control unit. In an alternative thereto, the necessary electrical energy can be transmitted to the transport elements or to the special element, respectively, via a lead disposed along the transport track. Furthermore, a combination of the configuration of the transfer elements or the special element, respectively, is conceivable as active transport elements or an active special element, respectively, with a transport track having individually controllable electromagnets.

Besides the above described section of the transport track designed as a magnetic route, the transport track can further comprise at least one section of the path along which the transport elements and the special element can be moved at a uniform speed. The section of the path can for this purpose comprise a drive device in the form of a conveyor belt, a conveyor chain, or the like. By combining sections of the path with a magnetic drive and sections of the path with a mechanical drive, the installation costs of the transport apparatus can be reduced. In an advantageous development, the configuration of the described response elements of the transport elements corresponds to the configuration of the response element of the at least one special element. In that the configuration of the response elements of the plurality of transport elements and the at least one special element are the same, maintenance of the transport elements and the special element can be facilitated.

In another development, the plurality of transport elements and the special element can be supported fully magnetically or in part magnetically and in part mechanically or fully mechanically on the transport track. With fully magnetic support, the above-described section of the transport track is configured as a magnetic levitation track, where electrical windings are provided in the transport track and/or the transport element or the special element, respectively, and cause magnetic levitation of the transport elements or the special element, respectively, above the transport track. This allows the friction between the transport element or the special element, respectively, and the transport track to be reduced to a minimum. With partly magnetic and partly mechanical support, the transport element or the special element, respectively, can additionally comprise one or more support elements, for example, in the form of support rollers and/or guide rollers. Partially or fully mechanical support by way of the at least one sliding bearing is also conceivable. Particularly inexpensive is an embodiment of the support of the transport elements and the special element by way of sliding bearings in combination with one or more guide rails of the transport track. The additional support elements or sliding bearings, respectively, there roll or slide on a running surface of the transport track. With fully mechanical support, the transport element or the special element, respectively, can be supported exclusively by the at least one supporting element or sliding bearing described. Additionally or alternatively, the support can also be effected pneumatically, where the transport track is in the respective partial section configured as an air suspension track. With pneumatic support, minimum friction arises between the transport elements or the special element, respectively, and the transport track, just like with fully magnetic support.

According to one development, the at least one special element can comprise an inspection device being adapted to determine a condition of the transport track at a predetermined location of the transport track. The inspection device can be configured such that it very generally inspects the transport track at the predetermined location for fouling and/or damage or also specifically inspects a specific property of the transport track, for example, in terms of friction described farther below of one or more support elements of the special element during movements along the transport track. The inspected condition of the transport track can there be detected either in terms of quality or quantity. Inspection in terms of quality, for example, for damage to a portion of the transport track, such as a guide rail, a running surface or the interaction elements can in particular lead to a binary result in the form of "damaged"/"not damaged". For inspection of the condition of the transport track in terms of quality, the inspection device can in particular comprise an optical element in the form of a digital camera which records one or more photos of the predetermined location of the transport track.

Such a digital camera can in one development also be used in a video mode for continuously capturing images of the transport track during a guided motion of the special element along the transport track. The one or more photos of the transport track created can there be immediately analyzed by the inspection direction [sic], in particular by a process unit of the inspection direction [sic], or are alternatively for the purpose of analysis passed to the open-loop and/or closed-loop control unit of the transport apparatus (see below). An analysis, be it by the inspection direction [sic] or by the open-loop and/or closed-loop control unit, can be effected following an image processing method known in prior art, where e.g. deformations, indentations, misalignment or heavy fouling of the transport track can be detected.

With an inspection of the predetermined location of the transport track in terms of quantity by the inspection device, a predetermined condition parameter of the transport track can be determined at the predetermined location. Such a condition parameter is given, for example, by a friction coefficient of a bearing or support element of the special element on the transport track, electric conductivity, or a degree of reflection of a surface of the transport track. The degree of reflection of a metallic surface, e.g. a running surface or a guide rail of the transport track can there serve as an indicator of fouling of the surface, for example, due to dust or lubricant. Such a degree of reflection can be determined, for example, by way of a laser element and a light detector of the inspection device. Conductivity of a metallic surface of the transport track, in particular of a running surface or a guide rail of the transport track, can also be determined by way of electrical contact of the special element with the metallic surface, e.g. in the form of carbon brushes. Like the degree of reflection, also the conductivity of the metallic surface measured can serve as an indicator for fouling of the metallic surface. A plurality of alternative inspection methods for detecting fouling of the transport track is there conceivable.

The location of the transport track to be inspected can be predefined in particular by way of the open-loop and/or closed-loop control unit of the transport apparatus. Having the location be predetermined by the operating personnel by way of an input device of the transport apparatus is there possible in order to examine a particular location of the transport track. Periodic inspection of entire sections and even the entire transport track can additionally be effected in a manner controlled by the open-loop and/or closed-loop control unit of the transport apparatus. For this purpose, the open-loop and/or closed-loop control unit of the transport apparatus guides the special element with the testing direction [sic] along the respective section or along the transport track, respectively, in particular with the flow of transport elements. While being guided along the transport track, the special element determines the condition of the transport track at predetermined temporal or spatial intervals. By carrying the special element with the flow of the transport elements along the transport track, inspection of entire sections of the path of the transport track can be effected during on-going operation of the container processing installation. If desired, the special element can with the inspection device by way of one or more track switches of the transport track be introduced into the flow of transport elements or discharged therefrom. Entire Inspection of the transport track can be performed in particular during an initialization process of the transport apparatus or the container processing installation by way of the open-loop and/or closed-loop control unit. A possibly required supply of the special element with electrical energy can as already described above be transmitted to the special element via induction transmission and/or by way of electrical contact with a lead disposed along the transport track.

In a further development, the special element can further comprise a transmitter unit, where the open-loop and/or closed-loop control unit comprises a receiver unit, and where the inspection device is further configured to transmit a signal describing the condition determined, in particular in the form of a condition parameter of the transport track, to the open-loop and/or closed-loop control unit. The transmitter unit can be a transmitter unit known in prior art for wireless transmission of signals, in particular by way of modulated electromagnetic waves. Accordingly, the receiver unit of the open-loop and/or closed-loop control unit can be a receiver unit known in prior art for wirelessly transmitted signals, in particular in the form of modulated electromagnetic waves. By way of the transmitter unit, the special element therefore transmits a signal defining the condition to the receiver unit of the open-loop and/or closed-loop control unit of the transport apparatus, which can process the signal by way of a process unit of the open-loop and/or closed-loop control unit and/or display the signal in a predetermined form on a display device, e.g. for interpretation by the operating personnel. The signal describing the condition can—as described above—be a recorded photo of the predetermined location of the transport track, a result of an inspection of such a photo, e.g. in the form of a binary qualification of the predetermined location as being damaged or not damaged, or one of the condition parameters of the transport track described above. The condition parameters friction coefficient for the motion of the special element along the transport track, the degree of reflection of a portion of the transport track, and the electrical conductivity of a portion of the transport track are here again to be mentioned as special configurations. The present invention, however, is not restricted to the condition parameters mentioned, but comprises any condition parameter describing the condition of the transport track, in particular in terms of damage and/or fouling.

The signal transmitted by the transmitter unit of the special element can after being received by the open-loop and/or closed-loop control unit be further processed and/or stored in a memory unit of the open-loop and/or closed-loop control unit, e.g. for later processing. The signal can also—as mentioned above—for evaluation by the operating personnel be reproduced on a display device provide for this. By analysis of the signal transmitted, the open-loop and/or closed-loop control unit of the transport apparatus can initiate possibly required cleaning or maintenance of the respective location of the transport track (see below). Upon diagnosing damage that can not be rectified automatically and also can significantly affect operation of the container processing installation and/or the quality of the products manufactured, the open-loop and/or closed-loop control unit of the transport apparatus can be designed such that it automatically runs down the transport apparatus and/or container processing installation for the purpose of maintenance or repair.

According to one development, the plurality of transport elements and the special element can at least in part be mechanically supported on the transport track, where the inspection device is adapted to determine a friction coefficient of at least one bearing element of the special element on the transport track. The at least in part mechanical support of the plurality of transport elements and the special element on the transport track can, as described above, be effected by way of mechanical bearing elements, such as support elements, support rollers and/or sliding bearings. Accordingly, the transport track—as likewise described above—can comprise complementary bearing elements, such as one or more guide rails, a guide channel and/or a running surface. The bearing elements of the transport elements or the special element, respectively, as well as the complementary bearing elements of the transport track are due to the at least in part mechanical support subject to wear that progresses over time, in particular to abrasion, roughening and/or corrosion, which can be quantified by a suitably selected degree of wear. The degree of wear of the one or more bearing elements of the transport element or the special element, respectively, and the degree of wear of the complementary bearing elements of the transport track there have a direct effect on the friction coefficient of the bearing element during a motion of the transport element or the special element, respectively, along the transport track. Increased wear of the bearing element or of the complementary bearing element there generally leads to an increase of the friction coefficient and thereby to an increased expenditure of force for moving the plurality of transport elements along the transport track at a predetermined speed.

To counteract unnecessary power consumption from an increased friction coefficient due to wear, the inspection device of the special element can according to the present development determine a friction coefficient of at least one bearing element of the special element on the transport track. To this end, the degree of wear of the bearing element of the special element is advantageously known at the time of inspection, so that the determined friction coefficient can be used as an indicator of the degree of wear of the one or more complementary bearing elements of the transport track. It can in particular be achieved by periodic and timely renewal of the one or more bearing elements of the special element that the degree of wear or the bearing elements of the special element at the time of inspection is known within predetermined tolerances.

The friction coefficient of the at least one bearing element of the special element can be determined, for example, based on the so-called following error when moving the special element at a predetermined speed along the transport track. For this purpose, the transport track can in addition to the plurality of interaction elements, which drive the special element preferably by way of a magnetic force, comprise a plurality of sensors disposed along the transport track, in particular magnetic sensors, for determining a position of the special element along the transport track. The interaction elements can there in particular be given by the above-described interaction elements for moving the special element by way of magnetic force. The interaction elements of the transport track, which can be designed in particular as electrical windings, are generally automatically by way of the open-loop and/or closed-loop control unit in general acted upon by an electrical current which is adapted to move the transport elements or the special element, respectively, at a desired speed or acceleration along the transport track. In case of insufficient current strength or with increased friction, the above-mentioned following error of the linear motor then occurs which is formed by the interaction elements of the transport track. This following error can there be determined by the plurality of sensors disposed along the transport track for determining a position of the special element.

In particular, by regular and periodic arrangement of sensors along at least a section of the transport track, the position of a transport element or the special element, respectively, can be determined in this section of the transport track. The sensor can be configured as an optical sensor, an electrical sensor, an electromagnetic sensor, or a mechanical sensor, where the position of the special element in the region of the sensor can be measured e.g. by measuring a light reflection on a reflector element of the special element, by induction of an electromagnetic signal due to the motion of the special element, by changes in electrical resistance of the sensor by utilizing a magnetoresistive effect, e.g. due to the magnetic flux of a magnetic reference element, in particular a permanent magnet, or the response element of the special element, or by local pressure measurement due to the weight of the special element. An electromagnetic sensor can there be designed as a Hall sensor which also provides a signal when the magnetic field, in which it is located, is constant. Likewise arising from the configuration of an electromagnetic sensor as a magnetic field sensor based on magnetoresistive effects such as anisotropic magnetoresistive effect (AMR effect), the "giant" magnetoresistance effect (GMR effect), and other magnetoresistive effects, such as the CMR effect and of the TMR effect, is a change in electrical resistance which is dependent on the magnetic field to be measured. Both Hall sensors as well as magnetoresistive sensors therefore allow determining the position of a transport element or of the special element, respectively, along the transport track even without inductive effects, i.e. also with a stationary transport element or special element, respectively. The respective sensor there detects a local change of the background magnetic field by the response element, in particular by a permanent or electromagnet of the transport element or special element, respectively, attached thereon. Alternatively or additionally, the special element can comprise a signal unit which detects one or more position signals being transmitted from spatially separate signal units of the open-loop and/or closed-loop control unit of the transport apparatus, in order to therewith, e.g. by delay measurements, determine the position of the special element along the transport track. This signal unit of the special element can be designed in particular as an RFID chip. From the difference between the position of the special element determined along the transport track and the position expected by the interaction elements based on the current strength, the following error can therefore be determined by the inspection device of the special element and/or the open-loop and/or closed-loop control unit of the transport apparatus. In an alternative thereto, the electric current strength by of the interaction elements of the transport track can by the open-loop and/or closed-loop control unit be adjusted to the degree that the actual and the expected positions correspond to each other. Conclusions can from the following error and the required increase in the current strength be drawn regarding the friction coefficient of the at least one bearing element of the special element on the transport track. It can in particular be examined by the inspection device of the special element and/or the open-loop and/or closed-loop control unit whether the following error determined or respectively the increase in current strength determined exceeds a predetermined tolerance value.

Alternatively, the inspection device of the special element can also be designed such that it can determine the friction coefficient of the at least one bearing element of the special element on the transport track also without determining the position of the special element along the transport track. For this purpose, the special element can comprise a first and a second partial element which are connected via a drag device, for example, in the form of a spring, a rod, a cable or the like. The first and the second partial element are there according to the invention at least in part mechanically supported on the transport track, where the inspection device of the special element is adapted to determine a friction coefficient of at least one bearing element of the dragged second partial element of the special element on the transport track. For this purpose, it is necessary—as described above—to know a degree of wear of at least one bearing element of the second partial element within predetermined tolerances. The first partial element of the special element there comprises one of the response elements described above, so that the open-loop and/or closed-loop control unit of the transport apparatus can, thereby actively, move the first partial element by interaction of its response element with the transport track. The open-loop and/or closed-loop control unit of the transport apparatus can in particular move the first partial element of the special element at a predetermined constant speed along the transport track. The second partial element is there due to its connection via the drag device moved along with the first partial element at the same constant speed, where a constant force F acts upon the drag device and thereby upon then first partial element due to the friction of the at least one bearing element of the second partial element on the transport track. This force can by way of a measuring apparatus, which is known in prior art for measuring force and is arranged as part of the inspection device at the first or second partial element of the special element, serve as an indicator of the friction coefficient to be determined. The force measured and/or the friction coefficient determined therefrom can then as a condition parameter of the transport track be transmitted—as described above—by way of a transmitter unit of the special element to a receiver unit of the open-loop and/or closed-loop control unit. If the force determined or the friction coefficient determined, respectively, exceeds a predetermined threshold value, then the one or more complementary bearing elements of the transport track are worn to a certain degree, which is therefore by the inspection device detected as a condition parameter of the transport track.

Increased friction, however, can also occur due to fouling or lack of lubrication of the one or more complementary bearing elements. The special element can for accurate diagnosis therefore additionally comprise inspection devices which can detect a degree of fouling or a lack of lubricant, for example, by determining the electrical conductivity of the complementary bearing elements of the transport track. When the specific friction coefficient or the specific force, respectively, exceeds a predetermined threshold value, automatic maintenance, automatic cleaning, or automatic lubrication of the affected area of the transport track can be initiated by the control and/or regulation unit of the transport apparatus (see below). Periodic monitoring of the degree of wear of the one or more complementary bearing elements of the transport track, for example, by guiding the special element with the inspection device along entire partial sections or the entire transport track, respectively, as well as subsequent maintenance of the bearing elements to be serviced, can therefore prevent an undesirable increase of the friction coefficient and thereby unnecessary power consumption of the transport apparatus. For this purpose, the special element can—as already mentioned above—be carried along with the respective inspection device with the flow of transport elements along the transport track, where continuous or periodic inspection of the friction coefficient can occur, controlled by the open-loop and/or closed-loop control unit of the transport apparatus.

According to one development, the special element can comprise a cleaning device which is configured to clean at least a portion of the transport track, in particular a guide rail of the transport track, at a predetermined location of the transport track. Cleaning the transport track at the predetermined location can there also comprise sterilizing or disinfecting the predetermined location. For cleaning, the cleaning device can comprises a brush, a compressed air nozzle, a nozzle for spraying cleaning agent, an ultraviolet light element for sterilizing. or similar cleaning elements, where other required elements, such as a supply of compressed air or a supply of cleaning agent can be given by way of an integrated reservoir and/or suitable supply lines of the transport apparatus. The special element with the cleaning device can in particular comprise a first and a second partial element, each of which is equipped with a response element, where the two partial elements are connected by a gear rack which meshes with a gear wheel of a brush rotatably mounted to the second partial element. With a relative motion of the first and the second partial element of the special element by way of the open-loop and/or closed-loop control unit, the brush can therefore be set to perform a rotational motion which can be used for removing fouling of the transport track. Cleaning the at least one portion of the transport track can take place at specific locations of the transport track predetermined by the open-loop and/or closed-loop control unit, in particular when fouling at the respective location has previously been detected by a special element with an inspection device. Cleaning can alternatively or additionally be done by guiding the special element with the cleaning element—controlled by the open-loop and/or closed-loop control unit—along a section or the entire transport track, respectively, where the cleaning device can be activated or deactivated by the open-loop and/or closed-loop control unit in order to clean respective partial sections of the transport track. The open-loop and/or closed-loop control unit can in particular be designed such that such cleaning of the transport track in sections or in its entirety occurs at predetermined periodic time intervals or even takes place continuously by carrying the special element with the cleaning device along in the flow of transport elements. Cleaning can alternatively or additionally be initiated by input from the operating personnel to the open-loop and/or closed-loop control unit, in particular, by entering the section to be cleaned. Parts of the transport track serving as complementary bearing elements, e.g. a running surface, a guide rail, or a guide channel, in general require periodic cleaning and/or periodic lubrication. The present invention, however, is not restricted to cleaning said complementary bearing elements, but can also comprise cleaning further parts of the transport track and/or individual container processing units.

According to a further development, the special element can comprise a lubricating device which is configured to apply lubricant at least to a portion of the transport track on which the plurality of transport elements and the special element are supported, in particular a guide rail of the transport track, at a predetermined location of the transport track As already repeatedly described, the portion of the transport track can in particular be a complementary bearing element of the transport track, e.g. a guide rail, a guide channel, or a running surface. As described above, lubricant can be applied at a single predetermined location or, alternatively, entire segments or the entire transport track can also be lubricated. A lubrication process can again be controlled by the open-loop and/or closed-loop control unit of the transport apparatus, where lubrication of the transport track can be initiated by user input or be performed at periodic intervals by the open-loop and/or closed-loop control unit. In this development, as well as in all the embodiments previously described, the open-loop and/or closed-loop control unit of the transport apparatus can by way of signals transmitted to the special element control a function of the respective device of the special element, for example, lubrication, cleaning or inspection. The signals can there be transmitted via a conductor and contacts disposed along the transport track, via inductive transmission and/or wirelessly via electromagnetic waves. With periodic lubrication or lubrication due to previously detected demand e.g. by way of a special element with an inspection device, frictional resistance between the plurality of transport elements and the transport track can be kept low, whereby operating costs of the transport apparatus can be saved.

In a further development, the special element can further comprise a reservoir for lubricant. The reservoir for lubricant can in particular be arranged detachably mounted on the special element. By way of a removable reservoir, straightforward replacement of the reservoir with a reservoir filled with lubricant can be realized.

The present invention therefore allows for automated and early detection of defects on the transport track, in particular at the guide and bearing system of the transport apparatus, as well as automation of preventative maintenance and cleaning. Unnecessary disturbance of the production process can thereby be prevented, resulting in higher machine availability of the container processing installation. In addition, less intervention by the operating personnel is required which always entails a risk for the operating personnel.

According to a further development, the special element can comprise a device for transporting tooling parts and/or supply parts for supplying media to the container processing installation and/or the transport apparatus. Such a device can be given e.g. by a holding device for the special tooling parts or supply parts, respectively. Tooling parts are presently parts which are used in a retooling process or for conversion of the container processing installation or the transport apparatus, respectively, such as forms, stretching stoppers, filling valves, format parts or the like. For a conversion, for example, for a product change, the required tooling parts must in general be transported to one or more specific tooling locations, in particular of processing units, of the container processing installation where they are subsequently introduced, positioned and/or mounted. This transport can according to the invention take place by way of one or more specifically configured special elements along the transport track. The required tooling parts can for this be delivered to a feeder to the at least one special element, be transported by the latter to the respective tooling location and there introduced into the respective processing unit. The tooling parts can be provided for the feeder by way of a magazine which is coupled to the transport apparatus. As already described several times, the function and movement of the special element are controlled by the open-loop and/or closed-loop control unit of the transport apparatus. Supply parts for supplying media of the container processing installation are presently in particular to be understood as being containers for transporting liquid or solid materials which are consumed in the container processing installation. Non-restricting examples presently only mentioned are containers for packaging material for a packaging device or containers for labels for a labeling device for the container processing installation. The supply parts for supplying media are like the tooling parts received by the special element at a location of the transport track and by the open-loop and/or closed-loop control unit of the transport apparatus in a controlled manner supplied to the respective processing unit.

In a particular development, the special element comprises a device for transporting cleaning-in-place (CIP) caps which can be transported as temporary tooling parts for CIP-cleaning of filling valves of a filling device of the container processing installation. Unlike with the above-mentioned tooling parts, a CIP cap can as a component of the special element be arranged directly on the latter, where height adjustment of the CIP cap can be achieved in particular by a relative motion of a first and a second partial element of the special element.

In a further development, the special element can further comprise a mounting device which is adapted to position and/or attach a tooling part and/or supply part carried along at a location of the container processing installation and/or the transport apparatus. Such a mounting device can be provided in particular in the form of a rotor arm that is controllable by the open-loop and/or closed-loop control unit of the transport apparatus and positions and/or attaches the tooling part and/or supply part carried along at a location of the container processing installation and/or the transport apparatus predetermined by way of the open-loop and/or closed-loop control unit. In addition, the mounting device can be configured such that it collects tooling parts and supply parts, respectively, at a reception point from a magazine coupled to the transport track, whereby the feeder is eliminated.

In a particular development, the transport apparatus can comprise two complementary special elements which comprise complementary holding devices for transporting blow molds to a stretch-blow-molding device of the container processing installation. The two special elements can there by way of the open-loop and/or closed-loop control unit of the transport apparatus be moved toward each other in such a manner that they receive a respective blow mold at a reception point and transport it as a train along the transport track to the respective stretch-blow-molding device. The blow molds can there like other tooling parts be provided in a magazine coupled to the transport track and be automatically used at the stretch-blow-molding device, e.g. by way of an assembly robot. Introducing, positioning or handling the tooling parts or supply parts, respectively, at the destination can also be done by an automation unit of the respective special element. With the aid of special elements for transporting and/or for mounting tooling parts and/or supply parts for supplying media, conversion or change-over of the container processing installation to another product can be largely automated, whereby production time is again saved. Such a format change can also take place in an inexpensive manner by request of the operating personnel, for example, by an input to an input unit of the open-loop and/or closed-loop control unit of the transport apparatus. The at least one special element for transporting tooling parts and/or supply parts can there be introduced into the flow of transport elements or be discharged therefrom as needed.

The above object is also satisfied by a method for performing a special function of a transport apparatus, comprising a plurality of individually controllable transport elements for transporting containers in a container processing installation along a transport track, by way of a special element which is different from the plurality of transport elements, wherein the plurality of transport elements and the special element are movably disposed on the transport track, the method comprising the steps of: moving the special element to a predetermined location of the transport track, and performing the special function at the predetermined location by use of the special element, wherein the special function is different from transporting containers, and wherein moving is controlled by an open-loop and/or closed-loop control unit of the transport apparatus.

The same variations and developments that have been described above in context with the transport apparatus according to the invention can presently also be applied to the method for performing a special function. The special function can in particular comprise inspecting, cleaning and/or lubricating the predetermined location of the transport track. Moving the special element to the predetermined location of the transport track is there performed in particular in an automated manner, for example, by way of the open-loop and/or closed-loop control unit of the transport apparatus, and in particular for performing the special function at periodic time intervals and/or upon request by the operating personnel. Both moving the special element to the predetermined location as well as controlling performance of the special function is according to the invention done by way of the open-loop and/or closed-loop control unit of the transport apparatus.

According to a further development, performing the special function can comprise inspecting the condition of the transport track at the predetermined location. Inspecting the condition, as described above, can there comprise qualitative and/or quantitative inspection, whereby a signal describing the condition determined can by way of a transmitter unit of the special element be transmitted to a receiver unit of the open-loop and/or closed-loop control unit of the transport apparatus. The signal transmitted can there comprise in particular one or more condition parameters of the transport track, e.g. a friction coefficient, a degree of reflection, a force, electric conductivity or the like, as described above. Depending on the signal transmitted, the open-loop and/or closed-loop control unit of the transport apparatus can initiate possibly required cleaning, lubrication and/or repair of the damaged and/or fouled portions of the transport track, in particular a guide rail, a guide channel or a running surface.

In a specific development, the special element can comprise a first and a second partial element, where the first partial element is connected to the second one via a drag device, where the first partial element comprises a measuring device, and where inspecting the condition of the transport track comprises the steps of: actively moving the first partial element along the transport track, dragging the second partial element by use of the drag device, and measuring the force upon the drag device during the dragging process by use of the measuring device.

Actively moving the first partial element along the transport track presently occurs, as already described above, by interaction of a response element of the first partial element with interaction elements of the transport track and controlled by the open-loop and/or closed-loop control unit of the transport apparatus. The drag device can—like above—be given by a spring, a rod, a cable or the like. Due to the frictional engagement of one or more bearing elements of the second partial element of the special element with one or more complementary bearing elements of the transport track, in particular a guide rail, the first partial element experiences a force via the drag device which can be measured by the measuring device of the first partial element of the special element. From the force measured, a conclusion can by way of a process unit of the special element be drawn regarding a friction coefficient of the one or more bearing elements of the second partial element with the one or more complementary bearing elements of the transport track. With knowledge of the degree of wear of the one or more bearing elements of the second partial element within predetermined tolerances, a degree of wear of the complementary bearing elements of the transport track can then be calculated by use of the force measured and the friction coefficient calculated therefrom. If the degree of wear determined exceeds the measured force or the specific friction coefficient exceeds a predetermined threshold value, then automated cleaning, lubrication and/or repair of the respective location, in particular of the complementary bearing elements can be initiated by way of the open-loop and/or closed-loop control unit of the transport apparatus.

According to a further alternative development, the special element can comprise a first and a second partial element, where performing the special function comprises cleaning at least a portion of the transport track, in particular a guide rail of the transport track, at the predetermined location and/or positioning and/or attaching a tooling part and/or a supply part for supplying media to the container processing installation and/or the transport apparatus at a location of the container processing installation and/or the transport apparatus, and where the special function is effected by a relative motion of the first and the second partial element. Here as well, the same variations and developments having been described above in the context of a cleaning device of the special element or a mounting device of the special element are applicable to the method according to the invention. The method according to the invention can in particular comprise the relative motion of a first and a second partial element which are connected by way of a gear rack, where a brush rotatably mounted on the second partial element is with a gear wheel meshing with the gear rack by a relative motion made to rotate, whereby the at least one portion of the transport track can be cleaned. Furthermore, the method according to the invention can in particular comprise placing a CIP cap by a relative motion of the first and the second partial element, where the CIP cap being disposed on an articulated arm connecting the first and the second partial element is adjustable in height.

With periodic or continuous inspection of the condition of the transport track of the transport apparatus, defects and/or fouling in particular of the guide and bearing system of the transport apparatus can be detected and rectified at an early stage and ideally be rectified before a disturbance arises following which valuable production time would be lost. Both preventive maintenance as well as cleaning, lubrication and/or repair of the transport track can be automated by way of the special elements or special functions described above. In addition, rapid conversion of the container processing installation for a format change can be done by the special elements especially configured for this. Automation of maintenance or conversion, respectively, in addition to the costs of operation of the container processing installation also reduces the risk for operating personnel.

BRIEF DESCRIPTION OF THE DRAWINGS

Further features and embodiments as well as advantages of the present invention are by way of example illustrated below using the drawings. It is understood that the embodiments do not exhaust the scope of the present invention. It is further understood that some or all features described hereafter can also be combined with each other in different ways.

DESCRIPTION OF THE PREFERRED EMBODIMENTS

Figure 1:
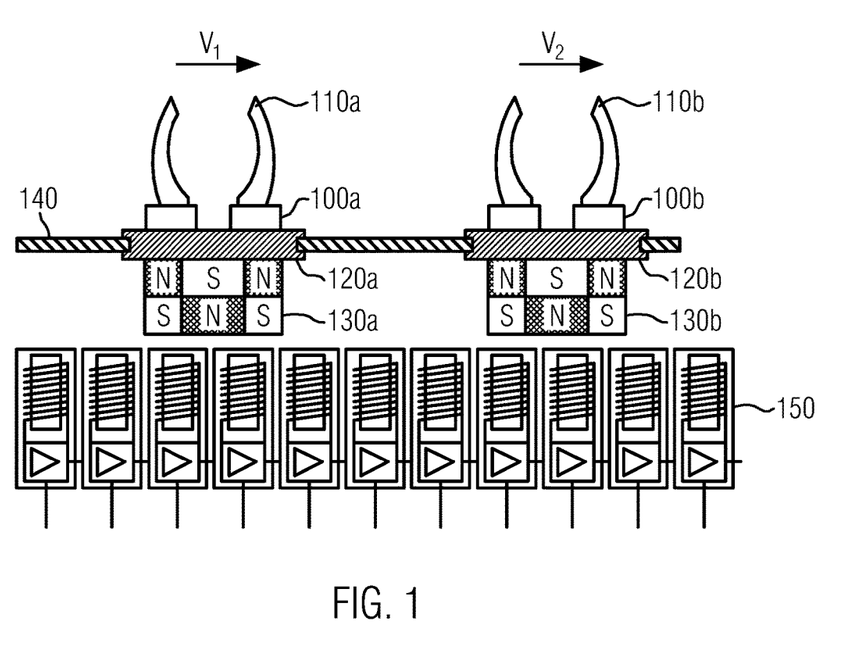
FIG. 1 illustrates an exemplary embodiment of two transport elements of the plurality of transport elements and of the interaction elements of the transport track.

Two transport elements 100a and 100b from the plurality of transport elements are illustrated by way of example in FIG. 1. However, the present invention is not restricted to the specific embodiments of the transport elements presently illustrated, but is applicable to any type of transport element as long as it can be guided individually along a transport track in a controllable manner, in particular when this is done by way of magnetic interaction with the transport track. Transport elements 100a and 100b presently shown can be guided by a guide rail 140 along the transport track. The transport elements in this particular embodiment are supported by sliding bearings 120a and 120b on guide rail 140. FIG. 1 further shows two gripping elements 110a and 110b by way of which the transport elements can receiver the containers.

The drive of the passive transport elements presently illustrated is effected by magnetic interaction between response elements 130a and 130b, respectively, of the transport elements and a plurality of electrical windings 150 along the transport track. Electrical windings 150 can there be actuated individually and as electromagnets individually have the polarity be reversed. By interaction of the magnetic fields of the electromagnets with the permanent magnets of the transport elements presently illustrated, the transport elements experience an action of force which with suitable control of electromagnets 150 leads to an acceleration, deceleration, or a uniform motion of the transport elements along guide rail 140. Presently shown response elements 130a and 130b of the transport elements are composed of three permanent magnets arranged alternately and perpendicularly to the guide rail, where the width of the center permanent magnet corresponds approximately to the distance between two adjacent electrical windings of the transport track, and the width of the outer permanent magnets each corresponds to half the distance of the adjacent electrical windings. With alternating polarity of adjacent electromagnets of the transport track, maximum force can be exerted upon the response element along the guide rail. By individually actuating electromagnets 150, transport elements 100a and 100b can be moved at different speeds $V_1$ and $V_2$ along guide rail 140. The magnets illustrated as being arranged perpendicular to the guide rail, however, can also be electromagnets. The special elements previously described in their configuration correspond to the transport elements presently shown, in that they comprise response elements and bearing elements of the same configuration. Only gripping elements 110a and 110b are missing in the special elements described above and are instead replaced by the devices described above. In addition, specific special elements can comprise a further partial element which can have its own response element, but does not necessarily need to (see examples below).

Figure 2A:
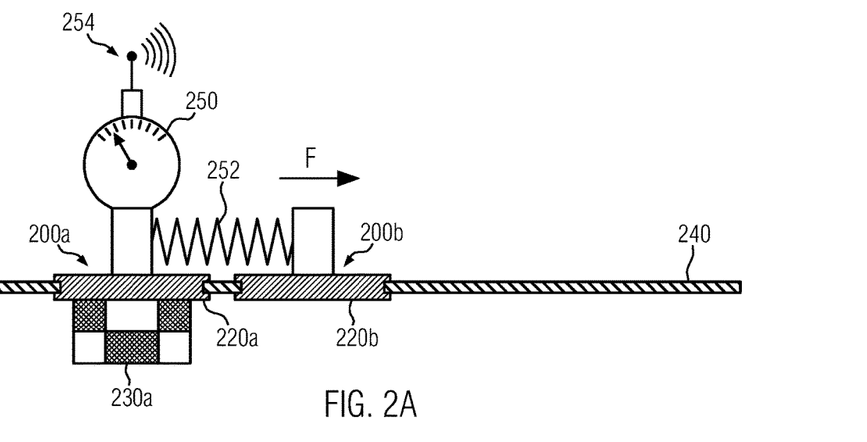
FIG. 2A illustrates a respective exemplary embodiment of a special element with an inspection device, a cleaning device, and a lubricating device according to the present invention.
Figure 2B:
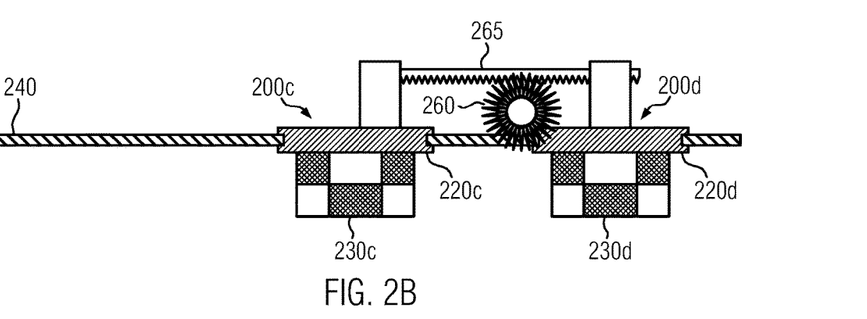
FIG. 2B shows a special element with an inspection device for determining a friction coefficient of a bearing element of the special element on the transport track.
Figure 2C:
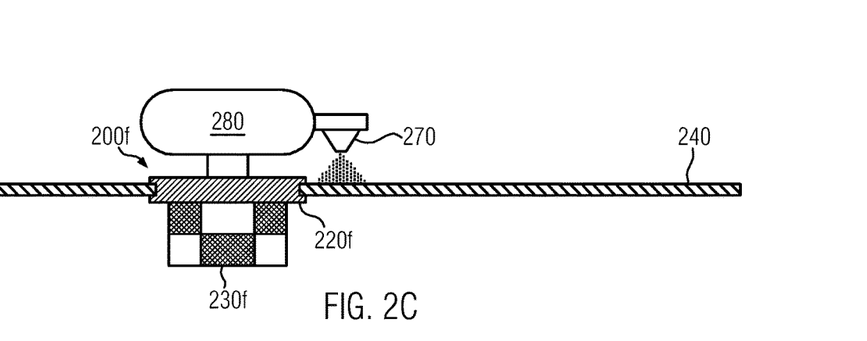
FIG. 2C shows a special element with a lubricating device for applying lubricant to guide rail 240.

FIG. 2 illustrates an exemplary embodiment of a special element with an inspection device, a cleaning device, and a lubricating device according to the present invention.

Partial FIG. 2A shows a special element with an inspection device for determining a friction coefficient of a bearing element of the special element on the transport track. The special element illustrated is composed of first partial element 200a and second partial element 200b, where the second partial element is connected to the first partial element via a drag device 252, presently by way of example illustrated as a spring. The first and the second partial element of the special element are presently each by way of example supported by one sliding bearing 220a and 220b on guide rail 240 of the transport track. Advantageously, bearing elements 220a and 220b are of the same configuration. While first partial element 200a comprises a response element 230a which can be moved by, in particular, magnetic interaction with interaction elements—presently not shown—of the transport track, second partial element 200b is dragged by way of drag device 252 by the first partial element along the transport track. Force F counteracting this motion is there measured by a suitable measuring device 250 of the first partial element and then by transmitter unit 254 of the first partial element transmitted to the open-loop and/or closed-loop control unit of the transport apparatus. A friction coefficient for sliding bearing 220b on guide rail 240 can alternatively by way of a process unit—presently not shown—of the special element be determined from the measured force F which is subsequently transmitted via transmitter unit 254 to the open-loop and/or closed-loop control unit. With the condition of sliding bearing 220b being known, conclusions can thereby via force F be drawn regarding the condition of the guide rail in terms of the friction and respective maintenance or lubrication of the guide rail can with continuous monitoring be initiated in time.

Partial FIG. 2B by way of example shows a special element with a cleaning device in the form of brush 260. Here as well, the special element is composed of first partial element 200c and second partial element 200d which are in this case connected via gear rack 265 to each other such that second partial element 200d can move relative to first partial element 200c. In the exemplary embodiment presently illustrated, both partial elements are each with a response element 230c and 230d actively in interaction with the interaction elements of the transport track movable along guide rail 240. Also in this non-restricting example, the partial elements are by way of sliding bearing 220c and 220d mounted on guide rail 240. One or more brushes for cleaning the transport track, in particular guide rail 240, are rotatably mounted to second partial element 200d, where a gear wheel connected to the one or more brushes for generating a rotation of the brushes meshes with the teeth of gear rack 265 such that a rotation of brushes 260 is generated by moving the second partial element relative to the first part element, whereby the transport track or the guide rail, respectively, is cleaned. The relative motion of the two partial elements can occur automatically and continuously oscillating or can be controlled by the open-loop and/or closed-loop control unit of the transport apparatus.

Partial FIG. 2C finally shows a special element with a lubricating device for applying lubricant to guide rail 240. Here as well, special element 200f is supported by sliding bearing 220f and response element 230f individually controllable on guide rail 240. Lubricant from reservoir 280 can by the open-loop and/or closed-loop control unit of the transport apparatus or an open-loop and/or closed-loop control unit—not shown—arranged on the special element be sprayed with nozzle 270 onto guide rail 240. Such lubrication can in manner controlled by the open-loop and/or closed-loop control unit be effected at periodic intervals and/or as required, in particular when measuring an increased friction coefficient of the special element shown in partial feature 2A. Reservoir 280 for the lubricant can by the operating personnel be replaced as a unit or when necessary be automatically replenished by way of a filling device along the transport track.

Figure 3A:
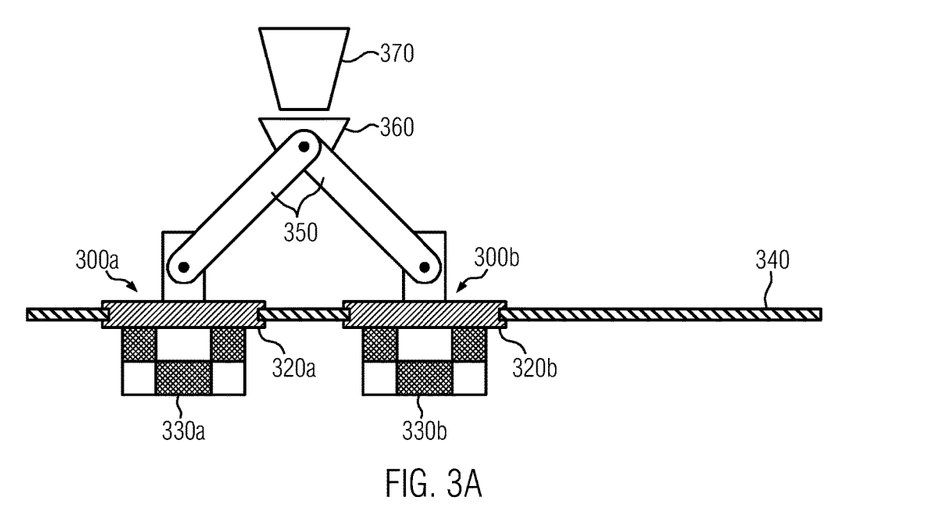
FIG. 3A illustrates a respective exemplary embodiment of a special element for positioning a CIP cap at a filling valve and for transporting a blow mold for a stretch-blow-molding device according to the present invention.

FIG. 3 illustrates an exemplary embodiment of a special element for positioning a CIP cap at a filling valve and for transporting a blow mold for a stretch-blow-molding device. The special element shown in partial FIG. 3A again comprises two partial elements 300a and 300b which are each by way of sliding bearing 320a or 320b mounted to guide rail 340 of the transport track and can with the aid of their response elements 330a and 330b be moved in an individually controlled manner along the transport track. The partial elements presently shown are connected to each other via an articulated rod 350 on which CIP cap 360 is arranged such that it can be raised by approximating the two partial elements and placed on a filling valve 370—presently shown by way of example—of a filling device of the container processing installation. After placing the CIP cap, cleaning of filling valve 370 can then automatically take place. The motion of the special element relative to the respective filling device and the relative motion of the two partial elements for positioning the CIP cap is there control by the open-loop and/or closed-loop control unit of the transport apparatus.

Figure 3B:
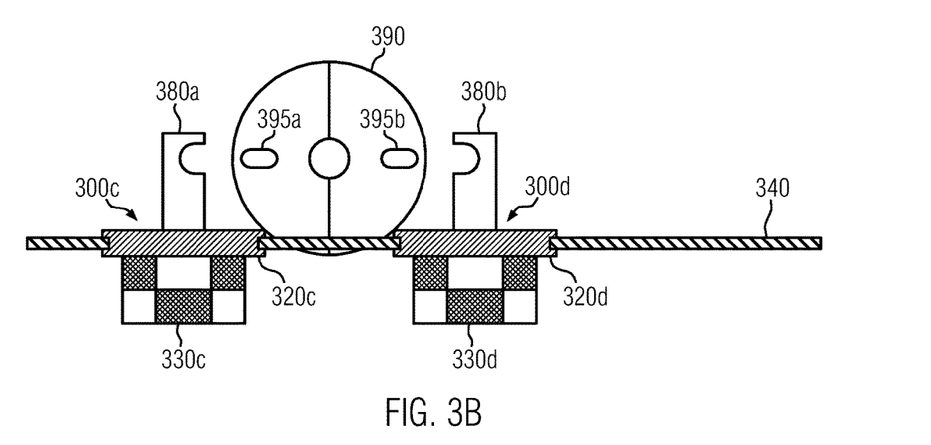
FIG. 3B illustrates a respective exemplary embodiment of a special element for positioning a CIP cap at a filling valve and for transporting a blow mold for a stretch-blow-molding device, including special brackets each having a recess to receive a handle of the blow mold.

Partial FIG. 3B finally shows two special elements 300c and 300d arranged in mirror image, which are each by way of sliding bearing 320a or 320b—shown by way of example—mounted to guide rail 340 of the transport track and can with the aid of their response elements 330a and 330b be moved along the transport track. The two special elements there each comprise bracket 380a and 380b, respectively, with a recess which can receive handle 395a and 395b, respectively, of a blow mold 390 by a relative motion of the two special elements. After the blow mold has been received by the two special elements, the two special elements can be moved jointly in a manner controlled by the open-loop and/or closed-loop control unit of the transport apparatus along the transport track, so that the blow mold can be transported to a stretch-blow-molding device of the container processing installation. The blow mold can there be mounted automatically e.g. by use of a mounting arm of the stretch-blow-molding device.

With the aid of the special elements shown in partial FIGS. 3A and 3B for performing a special function, automated cleaning of the filling valves of a filling device or automated exchange of blow molds of a stretch-blow-molding device of the container processing installation is enabled. Downtimes of the container processing installation and risks for the operating personnel when handling the container processing installation are thereby avoided, just like with the special elements shown in FIGS. 2A-2C for inspecting, cleaning and lubricating the transport track.

The invention claimed is:

1. A transport apparatus for transporting containers in a container processing installation comprising a transport track, a plurality of transport elements for transporting one or more containers, where said plurality of transport elements is movably arranged on said transport track, at least one special element which is movably arranged on said transport track and is different from said plurality of transport elements, and an open-loop and/or closed-loop control unit, where said transport track, said plurality of transport elements, and said special element are designed in such a way that said plurality of transport elements and said special element can be guided along said transport track in such a way that said plurality of transport elements and said special element are individually controllable by means of said open-loop and/or closed-loop control unit.

2. The transport apparatus according to claim 1, where said plurality of transport elements, said special element and at least a section of said transport track are formed such that said plurality of transport elements and said special element can in the area of said section of said transport track be moved by way of magnetic force.

3. The transport apparatus according to claim 1, where said plurality of transport elements and said special element are supported on the support track one of fully magnetically, in part magnetically and in part mechanically, or fully mechanically.

4. The transport apparatus according to claim 1, where said special element comprises an inspection device being adapted to determine a condition of said transport track at a predetermined location of said transport track.

5. The transport apparatus according to claim 4,
where said special element further comprises a transmitter unit,
where said open-loop and/or closed-loop control unit comprises a receiver unit, and
where said inspection device is further configured to transmit a signal describing the condition determined to said open-loop and/or closed-loop control unit.

6. The transport apparatus according to claim 5, the signal describing the condition determined being in a form of a condition parameter of the transport track.

7. The transport apparatus according to claim 4,
where said plurality of transport elements and said special element are at least in part mechanically supported on said transport track, and
where said inspection device is adapted to determine a friction coefficient of at least one bearing element of said special element on said transport track.

8. The transport apparatus according to claim 1, where said special element comprises a cleaning device which is configured to clean at least a portion of said transport track at a predetermined location of said transport track.

9. The transport apparatus according to claim 8, where the cleaning device is configured to clean a guide rail of the transport track at the predetermined location.

10. The transport apparatus according to claim 1, where said special element comprises a lubricating device which is configured to apply lubricant at least to a portion of said transport track on which said plurality of transport elements and said special element are supported at a predetermined location of the transport track.

11. The transport apparatus according to claim 10, where the special element further comprises a reservoir for the lubricant.

12. The transport apparatus according to claim 10, wherein the lubricating device is configured to apply lubricant at least to a guide rail of the transport track.

13. The transport apparatus according to claim 1,
where the special element comprises a device for transporting tooling parts and/or supply parts for supplying media to the container processing installation and/or the transport apparatus.

14. The transport apparatus according to claim 13,
where the special element further comprises a mounting device which is adapted to position and/or attach a tooling part and/or supply part carried along at a location of the container processing installation and/or the transport apparatus.

15. A method for performing at least one function of a group of functions comprising inspecting, cleaning, converting, and repairing a container processing installation having a transport apparatus including a plurality of individually controllable transport elements for transporting containers in the container processing installation along a transport track, by way of a special element which is different from said plurality of transport elements, where said plurality of transport elements and said special element are movably disposed on said transport track, said method comprising:
moving said special element to a predetermined location of said transport track, and
performing the at least one function of the group of functions at the predetermined location by use of said special element, and
where moving is controlled by an open-loop and/or closed-loop control unit of said transport apparatus.

16. The method according to claim 15, where performing at least one function of the group of functions comprises inspecting the condition of the transport track at a predetermined location.

17. The method according to claim 16,
where the special element comprises a first and a second partial element,
where the first partial element is connected to the second one via a drag device,
where the first partial element comprises a measuring device, and
where inspecting the condition of the transport track comprises:
actively moving the first partial element along the transport track,
dragging the second partial element by use of the drag device, and
measuring the force upon said drag device during the dragging process by use of the measuring device.

18. The method according to claim 15,
where the special element comprises a first and a second partial element,
where performing at least one function of the group of functions comprises cleaning at least a portion of the transport track, in particular a guide rail of the transport track, at the predetermined location and/or positioning and/or attaching a tooling part and/or a supply part for supplying media to the container processing installation and/or the transport apparatus at a location of said container processing installation and/or the transport apparatus, and
where the at least one function of the group of functions is effected by a relative motion of the first and the second partial element.

19. The method according to claim 18, where performing at least one function of the group of functions comprises cleaning a guide rail of the transport track at the predetermined location.

* * * * *